United States Patent

[11] 3,609,697

[72] Inventors Parker R. Blevins
Austin;
David W. Terry, Georgetown; Ray H. Thurmond, Austin, all of Tex.

[21] Appl. No. 769,149
[22] Filed Oct. 21, 1968
[45] Patented Sept. 28, 1971
[73] Assignee International Business Machines Corporation
Armonk, N.Y.

[54] PROGRAM SECURITY DEVICE
2 Claims, 5 Drawing Figs.

[52] U.S. Cl. .......... 340/172.5, 340/146.1
[51] Int. Cl. .......... G06f 11/04
[50] Field of Search .......... 340/146.1, 172.5; 235/157

[56] References Cited

UNITED STATES PATENTS

| | | | |
|---|---|---|---|
| 3,263,218 | 7/1966 | Anderson | 340/172.5 |
| 3,368,207 | 2/1968 | Beausoleil et al. | 340/172.5 |
| 3,377,624 | 4/1968 | Nelson et al. | 340/172.5 |
| 3,465,297 | 9/1969 | Thomas et al. | 340/172.5 |
| 3,239,816 | 3/1966 | Breslin et al. | 340/172.5 |
| 3,398,405 | 8/1968 | Carlson et al. | 340/172.5 |

*Primary Examiner*—Paul J. Henon
*Assistant Examiner*—Harvey E. Springborn
*Attorneys*—Hanifin and Jancin and John W. Girvin, Jr.

ABSTRACT: A program security device and method for a digital computer including a code generating circuit for providing a unique and predetermined output code to the digital computer for periodic comparison with identification information located within the stored program of the computer. If the identification information does not coincide with the output code, a jump operation is performed and certain portions of the stored program are changed in order to prevent the execution of the program. The output code can be utilized as a mask source for the program and/or a regenerative program routine can be utilized in order to prevent simple evasion of the routine.

INVENTORS.
PARKER R. BLEVINS
DAVID W. TERRY
RAY H. THURMOND

BY John W Girvin, Jr.
ATTORNEY.

PROGRAM SECURITY DEVICE

BRIEF BACKGROUND OF INVENTION

1. Field

The invention relates to a program security device and method for a digital computer and, more particularly, to a special input device utilized in conjunction with a programmed routine which insures that the program may be operated only with a predesignated computer.

2. Description of the Prior Art

Prior art digital computers may be classified within two general categories: special purpose date processors and general purpose data processors. Such special purpose machines are designed to perform a specific task while the general purpose data processor is designed to be programmed to perform one or more of many tasks. Once such a general purpose machine is designed, it is mass produced so that many similar data processing systems are owned by various members of the public.

A great deal of effort is expended by many owners of general purpose data processors in order to program the device so it will perform various tasks in an efficient manner. Often, such a programmed system contains information relative to the owner's business which he does not want to become known by others. In order to protect such information, it has been necessary to keep the programs containing the information under lock and key to prevent their unauthorized use by others on similar data processors. Unless elaborate security procedures are employed, such programs may be readily obtained since the program is usually in the form of a reel of magnetic tape or a deck of punch cards which may be easily and readily reproduced without the owner's knowledge.

Security systems have long been utilized in the communications industry to prevent unauthorized "listeners" from intercepting messages and thereafter deciphering the contents of such messages. These systems have included special encoding and decoding devices for the transmission and reception of secret messages. Once a message is thus encoded, it generally includes information which is matched with the hardware of the decoder. If the decoder has matching hardware, the message is unscrambled and if the decoder has no such matching hardware, the message remains scrambled and thus makes no sense to the "listener."

Security systems have been utilized in data processing systems when a plurality of users communicate with the data processor. In such a system, each user is assigned a predetermined area of storage within the data processor and only that user is supplied with information which allows him to access his own designated area. Other such areas may not be entered by that user. An example of such a system is described in the book entitled "IBM System/360 Principles of Operation," IBM Systems Reference Library, File No. S360–01, Form A22–6821–B1, at page 18. Neither the security systems employed the communications industry nor the security system employed to lock out various portions of storage in a general purpose data processor can be utilized to prevent unauthorized use of programs.

SUMMARY

In order to overcome the above-noted shortcomings of the prior art to provide each general purpose data processor owner with a program security device which prevents the unauthorized utilization of a data processor program on a similar machine by another, the present invention provides a code generating device which is associated with each data processor and which provides a unique code to the data processor for periodic comparison with identification information located within the stored program of the data processor. The identification information thus programmed is programmed in accordance with the information supplied by the code generating circuit. If the information thus supplied by the code generating circuit does not coincide with the identification information locate within a program, a jump operation is performed and certain portions of the stored program routine are changed in order to prevent execution of the program by the data processor.

In order to prevent the unauthorized user from quickly detecting the program location of the conditional jump routine, the code of the code generating circuit, and the location within the program of the comparing operation, all by the simple expediency of single cycling the computer through its various operations, various operations of the routine are segmented, and disguised through table lookup and masking routines. Further, the routine is periodically and randomly regenerated within the main program to insure that the factors utilized in the compare operations are not disturbed.

The foregoing and other features and advantages of the invention will be apparent from the following more particular description of the preferred embodiment of the invention as illustrated in accompanying drawings.

DESCRIPTION

Figures 1, 2:
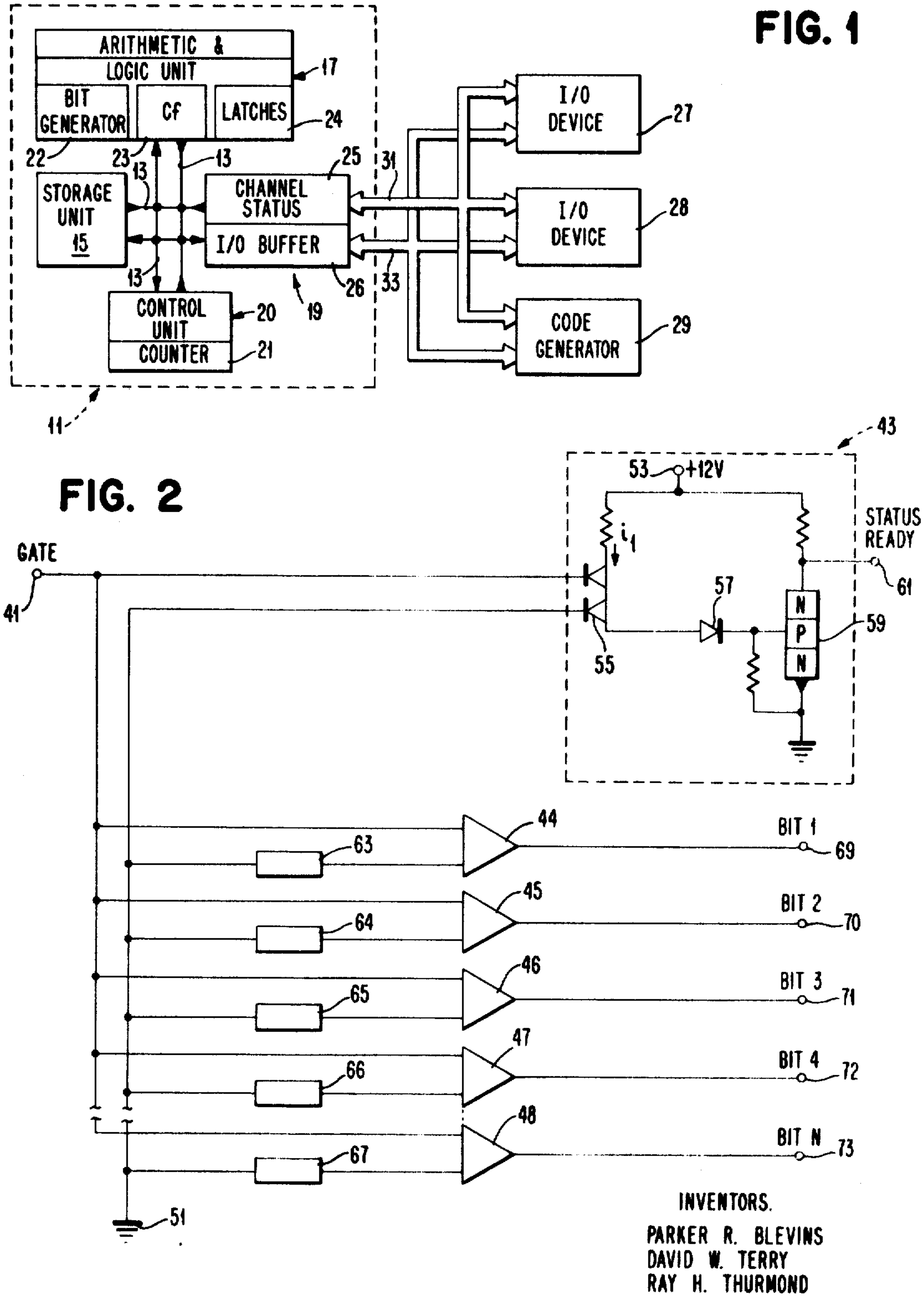
FIG. 1 is a block diagram of a general purpose data processor adapted to receive information from the program security code generating device through its input/output channel.
FIG. 2 is a block diagram of a program security code generating device.

Referring now to the drawings, and more particularly to FIG. 1 thereof, a block diagram of a general purpose data processor adapted to receive coded information on its input/output channel from a program security code generating device is depicted.

The data processor 11 consists of a plurality of functional units interconnected by multiple data paths 13. The functional units include a storage unit 15 adapted to receive and store data, an arithmetic and logic unit 17 adapted to perform arithmetic operations and logical functions, an input/output unit 19 which provides an interface between the data processor 11 and the input/output devices, and a control unit 20 adapted to control the operation of the data processor 11.

The storage unit 15 is of the type well known in the art and consists of a plurality of character storage positions, each of which are addressable by the address counter 21 of the control unit 20. Each such character storage position consists of a number of bistable devices for storing representations of the binary data bits which form a data character. A representation of a data character can thus be received and stored at or transmitted from the character position addressed by the control unit 20 in accordance with the operation defined by the control unit.

The arithmetic and logic unit 17 is also of the type well known in the art and contains arithmetic circuits for performing various arithmetic functions such as addition, subtraction, multiplication and division on data characters gated to it under the control of the control unit 20. The arithmetic and logic unit 17 also contains a bit generator 22, a compare circuit 23, and conditional latches 24. The bit generator 22 can change the binary significance of any bit of a data character as defined by the control unit 20. The compare circuit 23 compares any two data characters and indicates whether the first character is less than, equal to, or greater than the second character. The conditional latches 24 can be set on or off in accordance with the indication of the compare circuit, or in accordance with an instruction from the control unit 20.

The input/output unit 19 contains channel status logic 25 and an input/output buffer storage 26. The channel states logic 25 communicates with each of the input/output devices 27–28 and with the code generator 29 over the multiple path communication line 31. In this manner, status information, timing signals, input/output device command signals, and input/output device selection is communicated between the data processor 11 and the input/output devices. Any given input/output device can thus be uniquely selected, interrogated and controlled by the data processor 11. The input/output buffer storage 26 is connected to each of the input/output devices 27–28 and to the code generator 29 by the multichannel communication line 33 to provide a temporary storage for data signals transmitted between the storage unit 15 and the communication line 33.

When the control unit 20 initiates the execution of an INPUT instruction from the code generator 29, the channel status logic 25 will always indicate that the device's status is "ready." Thus, the input character supplied by the code generator can be immediately interrogated and transferred from the device to the input/output buffer storage 19 and thence directly into the storage unit 15 by way of one of the multiple data paths 13. The input character supplied by the code generator 29 is a fixed but programmable N bit character.

Referring now to FIG. 2 of the drawings, a block diagram of the program security code generator 29 of FIG. 1 of the drawings is depicted. As described heretofore, whenever interrogated the code generator provides a status ready signal and a fixed and unique N-bit input character. The code generator is interrogated whenever the channel status logic of the data processor supplies a positive gating signal to terminal 41. The positive gating signal is applied to one of the two input terminals of each of the NAND circuits 43–48. The other input terminal of the NAND circuit 43 is tied to the ground terminal 51, thus causing the current $i_1$ flowing from the +12 volt terminal 53 to be diverted through the diode 55. Since the current $i_1$ does not flow through the diode 57, the transistor 59 remains off and the output terminal 61 attached to the collector electrode of the transistor 59 is always positive.

Each of the NAND circuits 44–48 are also connected to the ground terminal, each through a corresponding segment 63–67. When the segment 63–67 is conductive, the corresponding NAND circuit operates in a manner identical to that described with respect to the NAND circuit 43 and always provides a positive output signal at its corresponding output terminal 69–73. If, however, the segment is nonconductive, the corresponding NAND circuit provides a negative output at its output terminal whenever the positive gating signal is applied to terminal 41. This is because at this time the current flowing from the supply terminal only has a current path to the base electrode of the transistor of the NAND circuit thereby turning the transistor on and causing the collector voltage of the transistor to drop to a down level. The segment 63 can be made of an etched metallic land pattern on a printed circuit card and can be made to become nonconductive by cutting the etched land.

Summarizing, the code generator circuit always provides a positive signal at terminal 61 indicating a ready status and supplies a negative signal at the output terminal 69–73 of the NAND circuits 44–48 which have their corresponding segments 63–67 made nonconductive whenever the positive gating signal is applied to the input terminal 41. Thus, by making the segments 63–67 conductive or nonconductive in conformance with a pattern randomly selected from a group of patterns, a unique and fixed N-bit code will be generated each time a gating signal is applied to the input terminal 41.

Referring once again to FIG. 1, the control unit 20 is responsive to stored instructions which are stored in the storage unit 15 to effect machine operations. Although a data processor generally has a large instruction set thus enabling many operations to be performed thereby, for the purposes of the following explanation the data processor 11 has the following eight instructions associated with it: (1) Input; (2) Compare; (3) Transfer; (4) Jump; (5) Conditional Jump; (6) Test Bit; (7) Edit Bit; (8) Add. Each of these instructions are further explained in the following table and, as appreciated by those skilled in the art, each such instruction may comprise of one or more machine instructions in order to achieve the defined instruction:

TABLE

| Instruction | Operation effected by control unit |
|---|---|
| INPUT from Device K to S*i*. | An N-bit character obtained from Input Device K will be transferred to Storage location *i*. |
| COMPARE S*j* to S*k*. | Contents of Storage location *j* will be compared with those of location *k*. CONDITIONAL LATCHES will be set as follows: if equal, set EQUAL and HIGH; if greater, reset EQUAL and set HIGH; if less, reset EQUAL and HIGH. |
| TRANSFER S*j* to S*k*. | Contents of Storage location *k* will be cleared, then the contents of location *j* will be stored in location *k*. |
| JUMP Instruction N. | Instruction execution sequence will be altered such that the next executed instruction will be Instruction N. Normal execution sequence follows a consecutive order, i.e., Instruction N+1 would follow N. |
| CONDITIONAL JUMP To Instruction N: (HIGH); (EQUAL); (NOT HIGH); (NOT EQUAL). | JUMP will be taken only if the defined state of the CONDITIONAL LATCHES (HIGH, EQUAL) are fulfilled. If not, the instruction execution sequence will follow the normal consecutive sequence. |
| TEST Bit K of S*i*. | Bit position K of Storage location *i* will be interrogated. Status of the bit controls the CONDITIONAL LATCHES as follows: If BIT K is On, set EQUAL and HIGH; If BIT K is Off, reset EQUAL and HIGH. |
| EDIT BIT K of S*i*: (Set BIT K ON if OFF); (Reset BIT K OFF if ON); (Set BIT K ON) (Reset BIT K OFF). | As defined by the instructions' operational code, BIT K of location *i* will be edited. CONDITIONAL LATCHES are not affected. Note that TEST BIT K and EDIT BIT K instructions are commonly combined. |
| ADD S*j* to S*k*. | Contents of Storage location *j* will be added to those of *k* with the sum being stored in location *k*. |

As mentioned above, representations of the instructions are stored in the storage unit 15 and are supplied to the control unit 20 which effects corresponding machine operations. Upon the completion of a machine operation, the next sequential instruction is supplied to the control unit 20 unless the machine operation were a jump operation. A jump operation causes a uniquely defined instruction to be thereafter supplied to the control unit. The address counter 21 is the device which is either incremented or jumped to the next instruction address to thereafter effect its access and operates in a well-known manner.

The sequence of instructions and the data information associated therewith (such as constant values associated with certain arithmetic operations) constitute a machine program. In the description which follows various examples of machine programs which can be utilized in conjunction with the code generator 29 to prevent the unauthorized utilization of the program on a data processor having no code generator or having a code generator which supplies a different code will be described.

Figure 3:
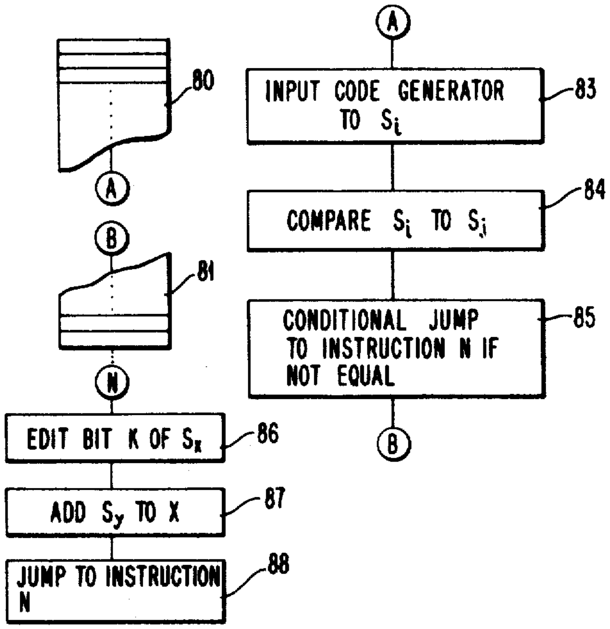
FIG. 3 is a block diagram of a computer program incorporating a program security routine.

Referring now to FIG. 3 of the drawings, a block diagram of a computer program incorporating a program security routine is depicted. The program to be protected is contained within blocks 80 and 81 and consists of a sequence of instructions, tables, and/or other predetermined values. Located within the program to be protected is a program security routine denoted by instruction blocks 83–88. This routine can be sequentially located within the program to be protected and, as denoted by block 83, causes the input code generator 29 of FIG. 1 to provide its output code which is then stored in storage location $S_f$. Thereafter, as noted by block 84, the contents of the storage location $S_f$ are compared with the contents of the storage location $S_j$. The storage location $S_j$ is initially set with a character having a bit configuration identical to the bit configuration of the character supplied by the code generator. Thus, the equal latch within the arithmetic and logic unit 17 in FIG. 1 should be set on indicating the comparison is equal. Thereafter, as indicated by block 85, a conditional jump to instruction N is performed if the equal latch is not On. If, however, the equal latch is On, the program continues on through block 81.

The comparison performed in instruction block 81 would result in the failure to set the equal latch if the input of the code generator as defined in block 83 did not correspond to the value stored in a storage location $S_j$. This could occur if no input code generator was associated with the data processing system or, if a code generator providing a different output code was associated with the system. In either instance, the conditional jump to instruction N would be performed if the equal latch were not set. Instruction N, as noted by block 86, causes a predetermined bit K, of storage location $S_x$ to be edited and, hence, changed, Thereafter, a constant stored in storage location $S_y$ is added to the value X as denoted by block 87 and, the program loops back to block 86 due to the jump instruction contained in block 88. Since the value of X is now changed, bit K of another storage location as defined by the value of X is changed and the program continues on in a loop. In this manner, a predetermined bit of a number of the instructions contained within the program to be protected is changed. This operation prevents further execution of the program.

As is apparent to those skilled in the art, instead of editing a single bit of selected instructions, various combinations of bits could be edited, the entire program could be cleared, or new instructions could be substituted which would result in unusual error conditions.

Figure 4:
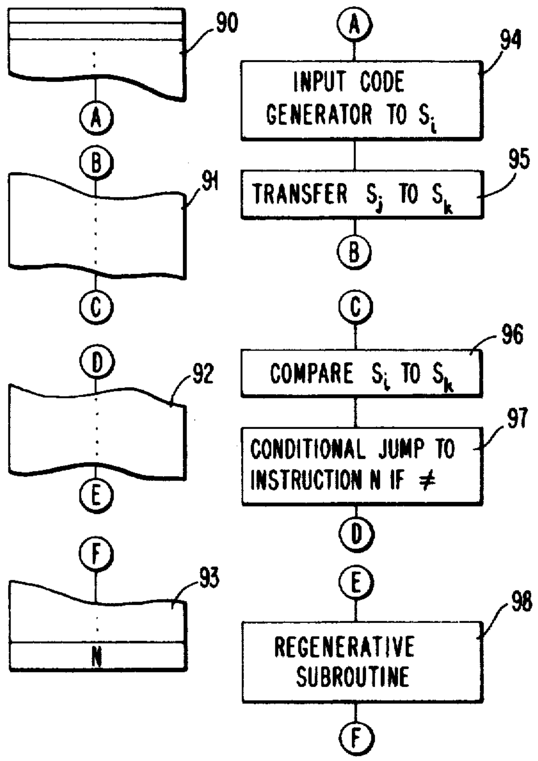
FIG. 4 is a block diagram of a computer program incorporating a program security routine in conjunction with a regenerative routine.

Referring now to FIG. 4 of the drawings, a block diagram of a computer program incorporating a program security routine in conjunction with a regenerative routine is depicted. To combat simple evasion of the program security routine, it has been segmented and scattered throughout the main program and, also a regenerative routine which is isolated and independent from the program security routine been incorporated to further combat simple evasion. The program to be protected is schematically depicted in blocks 90–93, the program security routine is depicted in blocks 94–97, and the regenerative routine is schematically depicted in block 98. The instructions depicted by blocks 94–97 may be randomly scattered throughout the program, the only requirement being that the conditional jump routine depicted in block 97 must follow the compare instruction as denoted by block 96 prior to the execution of another compare instruction which would change the status of the conditional latches. Thus, the program proceeds through block 90 to block 94 where the input code from the code generator is transmitted to the storage location $S_i$. Thereafter, the constant value stored in the program is transferred from storage location $S_i$ to $S_k$ as denoted by block 95. This instruction could occur immediately after block 94 as depicted or elsewhere within the program. Thereafter, the program proceeds to block 91 and thence to block 96 where the contents of the storage location $S_f$ containing the code generator signal is compared with the contents of storage location $K_k$. As indicated by block 97, a conditional jump to instruction N is performed if the comparison results in a not equal condition. Otherwise, the program proceeds through block 92 and thence to block 98 to the regenerative subroutine. The regenerative subroutine effects the same sequence of instructions defined by blocks 95–97 and thus regenerates the program security routine. In this manner the program security steps can be repeated over and over throughout the program thereby insuring against simple evasion. It should be noted that the instruction N of this routine is similar to the instruction N described with respect to FIG. 3.

Figure 5:
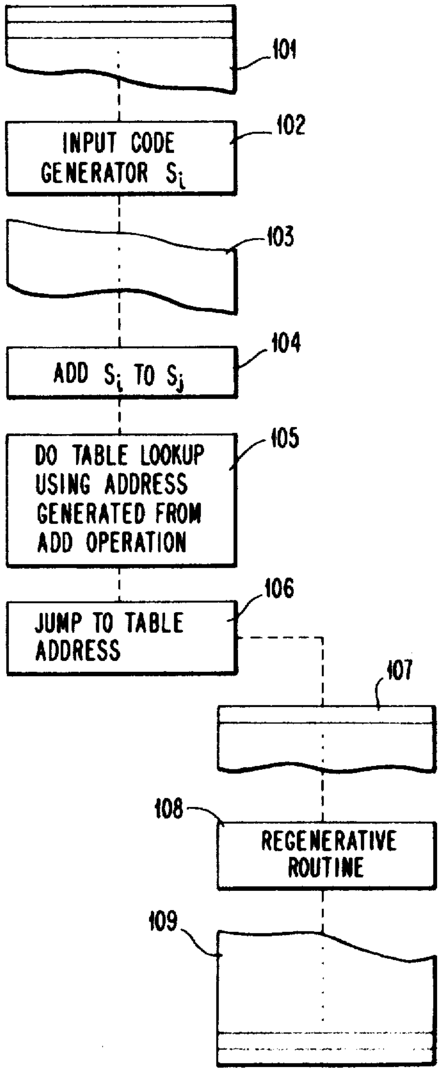
FIG. 5 is a block diagram of a computer program incorporating a program security routine in conjunction with a mask routine.

Referring now to FIG. 5 of the drawings, a block diagram of a computer program incorporating a program security routine in conjunction with a mask and table lookup-type of operation is depicted. The program to be protected is schematically represented by blocks 101, 103, 107 and 109. The instructions comprising the program security routine and the masking operation are again scattered and segmented within the program. The first such instruction is schematically represented by block 102 and consists of storing the input character from the code generator in storage location $S_i$. Thereafter, as denoted by block 104, the contents of the storage location $S_i$ are added to a constant value stored in storage location $S_j$. Storage location $S_j$ then contains a new constant value which is utilized to generate a table address. Also stored internally in the storage unit is a data table consisting of a series of data words. Each of the data words contains an address corresponding to an instruction address. Thus, by utilizing the address generated from the add operation defined in block 104, a unique instruction address stored within the table is accessed. Thereafter, as defined by block 106, the program jumps to the instruction defined by the address word stored within the table and continues as denoted by block 107. A regenerative routine as denoted by block 108 can be utilized to repeat the steps 102, 104 and 105. Since the value stored in storage location $S_j$ is changed with the first add operation, a new table address will be generated, thus insuring that when the jump instruction is performed, the program will continue in its proper location in block 109.

As is re readily apparent, if an improper input code is supplied by the code generator and stored in storage location $S_i$, the program will not properly sequence since the wrong table address would be obtained thereby causing the program to jump to an proper instruction. In this manner, the characters supplied by the input code generator are used as a "mask" for generating the address required for a table lookup routine. Another use of the fixed input character as a mask would be to interrogate a predefined bit position of the input character and to thereafter edit the normal input data from another input device as a function of the status of the interrogated mask bit position.

Referring once again to FIG. 1 of the drawings, it has been described how the input character from the code generator 29 is utilized in conjunction with the program information stored in the storage unit 15 to insure that the program information is not utilized in conjunction with a similar data processor having a different code generator 29. Further, various program routines insuring against simple evasion of the checking operation have been described. As is apparent to those skilled in the art, various combinations of these routines may be utilized and spread throughout the program to make evasion a very difficult and time consuming task. Furthermore, various forms of code generators 29 other than that described with respect to FIG. 2 of the drawings can be utilized to provide a programmable fixed bit output. Additionally, while the code generator has been described as providing an output signal to an input/output channel, it is apparent to those skilled in the art that it could be incorporated within the control unit in the form of a fixed register of read only storage.

While the invention has been particularly shown and described with reference to the preferred embodiment thereof, it should be understood by those skilled in the art that the foregoing and other changes in form and detail may be made therein without departing from the scope of the invention.

What is claimed is:

1. A method for insuring that a sequence of stored program instructions are performed only by a data processing system having a code generating device which generates a programmably unalterable, unique, predefined code comprising the steps of:

controlling said data processing system by initiating the performance of said sequence of stored program instructions, said stored program instructions including a predetermined instruction;

generating said unique predefined code by said code generating device in response to said predetermined instruction, said predetermined instruction further defining stored information corresponding to the unique predefined code;

comparing the generated code with said defined stored information;

Changing the information content of subsequent instructions in said sequence of stored instructions so as to render said subsequent instructions of stored program inoperable if the compared generated code differs from the compared defined stored information.

2. A programmable data processor comprising:

storage means for storing character representations including characters representative of a sequence of data processing instructions;

storage addressing means for normally accessing said sequence of data processing instructions in a predetermined ordered program sequence including means for alternatively accessing a nonsequential instruction defined by an accessed conditional branch instruction in response to a control signal;

an actuable code generator responsive to a predefined data processing instruction accessed from said storage means for providing a fixed, constant and programmably unalterable character output signal;

actuable compare means responsive to said accessed predefined data processing instruction and to the output signal of the code generator for providing an output noncompare signal whenever said character output signal fails to correspond to a predetermined stored character representation defined by said accessed predefined data processing instruction;

control means responsive to said output noncompare signal and to a conditional branch instruction accessed subsequent to the accesses of said predefined instruction for providing said control signal;

bit generator means responsive to said accessed consequential instruction for changing stored character representations representative of subsequent instructions in said sequence of instructions in said storage means.